United States Patent [19]

Töpfl

[11] 4,376,078
[45] Mar. 8, 1983

[54] REACTION PRODUCT SALTS OF EPOXIDES, POLYALKYLENEPOLY-AMINOAMIDES, FATTY AMINES AND FATTY ACIDS OR FATTY ACID ESTERS, HALIDES, ISOCYANATES OR KETENE DIMERS

[75] Inventor: Rosemarie Töpfl, Dornach, Switzerland

[73] Assignee: Ciba-Geigy Corporation, Ardsley, N.Y.

[21] Appl. No.: 246,353

[22] Filed: Mar. 23, 1981

[30] Foreign Application Priority Data

Mar. 28, 1980 [CH] Switzerland .................. 2491/80

[51] Int. Cl.$^3$ .......................................... C07C 103/00
[52] U.S. Cl. ................... 260/404.5; 252/357
[58] Field of Search ..................... 260/404.5 EO

[56] References Cited

U.S. PATENT DOCUMENTS 3,709,847  1/1973  Toepfl et al. ............. 260/404.5
3,716,402  2/1973  Hicks ....................... 260/404.5
3,843,391  10/1974 Toepfl ..................... 260/404.5 EO
3,904,661  9/1975  Pusch ...................... 260/404.5 EO
3,957,574  5/1976  Anderson .................. 162/167
4,113,506  9/1978  Sackmann et al. ........... 106/238

FOREIGN PATENT DOCUMENTS 2374467  6/1980  France.

*Primary Examiner*—John F. Niebling
*Attorney, Agent, or Firm*—Edward McC. Roberts

[57] ABSTRACT

Novel reaction product salts of (A) 1.0 epoxy group equivalent of a diglycidyl ether, (B) 0.2 to 1.0 amino group equivalent of a polyalkylenepolyaminoamide of (B') a polymerised, unsaturated fatty acid and (B'') an aliphatic polyalkylenepolyamine, (C) 0.3 to 0.6 amino group equivalent of a primary fatty amine, (D) 0 to 1.0 mol of an epihalogenohydrin per epoxy group equivalent of component (A) and (E) 0.01 to 0.5 mol of a fatty acid or lower alkyl ester, isocyanate, halide or ketene dimer thereof per amino group equivalent of components (B) and (C), which can be used as paper sizes.

36 Claims, No Drawings

REACTION PRODUCT SALTS OF EPOXIDES, POLYALKYLENEPOLY-AMINOAMIDES, FATTY AMINES AND FATTY ACIDS OR FATTY ACID ESTERS, HALIDES, ISOCYANATES OR KETENE DIMERS

The invention relates to novel reaction products of (A) 1.0 epoxy group equivalent of a diglycidyl ether of 2,2-bis-(4'-hydroxyphenyl)-propane, (B) 0.2 to 1.0 amino group equivalent of a polyalkylenepolyaminoamide of (B') a polymerised, unsaturated fatty acid which is derived from fatty acids having 12 to 24 carbon atoms and (B'') an aliphatic polyalkylenepolyamine having 4 to 12 carbon atoms, (C) 0.3 to 0.6 amino group equivalent of at least one primary fatty amine having 12 to 24 carbon atoms, (D) 0 to 1.0 mol, per epoxy group equivalent of component (A), of an epihalogenohydrin and (E) 0.01 to 0.5 mol, per mol of amino group equivalent of components (B) and (C), of at least one saturated or unsaturated fatty acid having 12 to 24 carbon atoms, or an alkyl ester, having 1 to 4 carbon atoms in the alkyl radical, isocyanate, halide or ketene dimer thereof, the reactions being carried out, if appropriate, in the presence of an inert, organic solvent at temperatures up to 110° C., and it being ensured, by adding an acid, at the latest when the reactions have ended, that a sample of the reaction mixture diluted with water to 10 to 40 percent by weight has a pH value of 2 to 8, a salt being formed.

The invention also relates to the preparation process for the reaction product salts of the said components (A), (B), (C), (E) and, if desired, (D), the use of the reaction products as paper sizes, a process for engine-sizing and, in particular, surface-sizing paper using the reaction products, and the paper sized by this process.

Components (A) from which the reaction products according to the invention are obtained are diglycidyl ethers of 2,2-bis-(4'-hydroxyphenyl)-propane, also called bisphenol A, which preferably have an epoxide content of 1.8 to 5.8, in particular 5 to 5.5, epoxy group equivalents/kg. Particularly preferred epoxides of this type are those of the formula

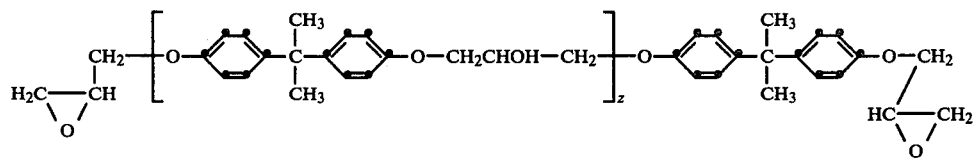

(1)

in which z is an average number with a value from 0 to 0.65. 0 is of especial interest as a value of z. Such epoxides are obtained, for example, by reacting 2,2-bis-(4'-hydroxyphenyl)-propane with epichlorohydrin or bis-halogenohydrin compounds and then treating the product with a base.

The polymerised unsaturated fatty acids used as component (B') for the formation of the polyalkylenepolyaminoamide (B) are preferably dimerised to trimerised fatty acids which are derived from monocarboxylic acids having 12 to 24, preferably 16 to 22 and in particular 16 to 18, carbon atoms. These monocarboxylic acids are fatty acids with at least one, preferably 2 to 5, ethylenically unsaturated bonds. Representatives of this class of acids are, for example, lauroleic acid, myristoleic acid, palmitoleic acid, physetoleic acid, oleic acid, elaidic acid, petroselinic acid, eicosenoic acid, cetoleic acid, gadoleic acid and erucic acid and, preferably, eleostearic acid, parinaric acid, arachidonic acid, clupanodonic acid and nisinic acid, and in particular linoleic acid and linolenic acid. These fatty acids can be obtained from natural oils of vegetable or animal origin, in which they occur, in particular, as glycerides.

The dimerised to trimerised fatty acids (B') used according to the invention are obtained in a known manner by dimerisation of monocarboxylic acids of the type mentioned. The so-called dimerised fatty acids are industrial mixtures which always have a content of trimerised acids and a small content of monomeric acids.

Particularly suitable components (B') are dimerised to trimerised linoleic acid and linolenic acid. The industrial mixtures of these acids as a rule contain 75 to 95 percent by weight of dimerised acid, 4 to 25 percent by weight of trimerised acid and a trace to 3 percent by weight of monomeric acid. The molar ratio of dimerised to trimerised acid is accordingly about 5:1 to 36:1.

Suitable components (B'') are, in particular, polyalkylenepolyamines of the formula

in which n is 1 to 5, preferably 1, 2 or 3, that is to say diethylenetriamine, triethylenetetramine or tetraethylenepentamine, triethylenetetramine being particularly important.

In the case of amine mixtures, it is also possible to assume that n has a non-integral average value, for example between 1 and 2. Industrial amine mixtures of the type mentioned are also preferred.

Particularly interesting components (B) are polyalkylenepolyaminoamides of dimerised to trimerised linoleic or linolenic acid and triethylenetetramine.

Very suitable components (C) are, in particular, saturated or unsaturated primary fatty amines having 12 to 24, preferably 16 to 22 and in particular 16 to 18, carbon atoms.

The amines are thus, for example, laurylamine, myristylamine, arachidylamine or behenylamine and, in particular, palmitylamine, stearylamine or oleylamine. The amines are also, in particular, mixtures of such amines such as are obtainable as industrial products.

Polyalkylenepolyaminoamides, as component (B), and mono-fatty amines, as component (C), which each contain 3 to 4 amino group equivalents per kg, are of especial interest.

The halogenohydrin used as the optional component (D) is, in particular, epibromohydrin or, especially, epichlorohydrin.

Components (E) are saturated or unsaturated fatty acids having 12 to 24, preferably 16 to 22 and in particular 16 to 18, carbon atoms, or alkyl esters thereof having 1 to 4 carbon atoms in the alkyl radical, i.e. the isobutyl, butyl, isopropyl or propyl esters, and preferably the ethyl esters and, in particular, the methyl esters, or halides thereof, preferably the bromide or, in particular, the chloride, or isocyanates or ketene dimers thereof. Representatives of these fatty acids having 12 to 15 carbon atoms are, for example, dodecenoic acid and tetradecenoic acid and, in particular, lauric acid and myristic acid. Representatives of the preferred fatty acids having 16 to 22 carbon atoms have already been mentioned for component (B'). Fatty acids having 16 to 18 carbon atoms, such as palmitic acid, stearic acid and oleic acid, and in particular the said fatty acid methyl esters, chlorides, isocyanates or, in particular, ketene dimers, are of especial interest. The ketene dimers of such fatty acids are known per se, and their preparation is described, for example, in U.S. Pat. No. 2,383,863 or in Chem. Abst. 56, 12747 i (1962). Ketene dimers of this type have a cyclic structure which, for example, has the formula

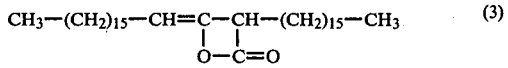
(3)

in the case where stearic acid or stearic acid chloride has been used for their preparation.

The organic solvent in the presence of which the reactions of components (A), (B), (C), (E) and, if desired, (D) are carried out is inert, i.e. it is unable to react with any of the components mentioned, as long as neither a fatty acid chloride nor a fatty acid isocyanate is used as component (E).

In the present invention, so-called fatty acid isocyanates are to be understood as meaning isocyanates which have long-chain alkyl or alkenyl radicals and which are obtainable, for example, by reacting the corresponding fatty amines with phosgene. Representatives of such isocyanates are octadecene isocyanate, docosane isocyanate, dodecyl isocyanate and, in particular, octadecyl isocyanate.

The organic solvents are, in particular, water-soluble organic solvents and, especially, those which are miscible with water in all proportions are advantageous. Examples are cycloaliphatic and aliphatic ethers having 3, or, preferably, 2, oxygen atoms and 2 to 8, preferably 4 to 8, carbon atoms, such as dioxan, ethylene glycol mono-n-butyl ether (=n-butylglycol) and diethylene glycol mono-n-butyl ether, and in particular alkanols having 1 to 4 carbon atoms, for example isopropanol, ethanol and methanol.

In addition, however, it is also possible to carry out the reactions in the presence of water-insoluble organic solvents, for example in benzine hydrocarbons, such as benzine, petroleum ether, benzene or benzenes which are halogenated or substituted by lower alkyl groups, such as toluene, xylene or chlorobenzene; alicyclic compounds, such as tetralin or cyclohexane; and halogenated hydrocarbons having preferably 1 or 2 carbon atoms, such as methylene chloride, methylene bromide, chloroform, carbon tetrachloride, ethylene chloride, ethylene bromide, s-tetrachloroethane and, in particular, trichloroethylene or perchloroethylene. These solvents are, in particular, if fatty acid chlorides or isocyanates are used as component (E). In this case, however, the reaction with component (E) can also be carried out in the melt.

As a rule, all the reactions are carried out in the same solvent, isopropanol being of especial interest.

The preferred temperature range in which the reactions in the solvents mentioned are carried out is 20° to 110° C., preferably 40° to 95° C. and in particular 60° to 95° C.

The additional acid which is required for adjusting the pH value to 2 to 8 can be either an inorganic acid or an organic acid having at most 4 carbon atoms.

The inorganic acids are, in particular, hydrochloric or nitric acid, and preferably phosphoric acids, in particular orthophosphoric acid, and, furthermore, sulfamic acid. The organic acids are saturated di- or, preferably, mono-carboxylic acids having at most 4 carbon atoms, such as oxalic acid, malonic acid and succinic acid, and preferably formic acid, acetic acid and propionic acid. Mixtures of the acids mentioned can likewise be used. Volatile, saturated monocarboxylic acids, such as formic acid, and especially acetic acid, are of particular importance.

Orthophosphoric acid, sulfamic acid and oxalic acid, if desired in the presence of formic acid or acetic acid, i.e. sulfamic acid by itself on the one hand, or orthophosphoric acid with subsequent addition of formic acid or acetic acid on the other hand, are also preferred. The use of formic acid and, in particular, acetic acid by themselves is of especial interest, reaction product salts which have a preferred pH value from 4 to 6 when diluted with water being obtained. Homogeneous emulsions of the reaction product salts (A) which have a salt content, calculated as solids, of 15 to 35 percent by weight are as a rule obtained.

The acid is advantageously already added during the reaction of components (A), (B), (C), (E) and, where relevant, (D), or is added only after the reactions have ended. If the alkyl ester, isocyanate or halide of a fatty acid of the type mentioned is used for component (E), the acid is preferably added after the reaction with component (E). On the other hand, if the fatty acid itself or its ketene dimer of the type mentioned is used for component (E), the acid is preferably added before the reaction with component (E).

If component (D) is also used, 0.1 to 0.5, and in particular 0.1 to 0.2, mol of component (D) is preferably employed per epoxy group equivalent of component (A). However, reaction products which are prepared only from components (A), (B), (C) and (E), i.e. in the absence of component (D), are particularly preferred. In this case, 0.4 to 0.8, in particular 0.3 to 0.6, amino group equivalent of component (B) is employed per epoxy group equivalent of component (A). Equivalent amounts of components (B) and (C), calculated as amino group equivalent of components (B) and (C) and based on 1.0 epoxy group equivalent of component (A), are thus of especial interest.

If a fatty acid or its isocyanate, ester or halide of the type mentioned is employed as component (E), 0.02 to 0.5 mol of component (E) is preferably employed per amino group equivalent of components (B) and (C). In particular, when the optional component (D) is not employed, 1 epoxy group equivalent of component (A) and 0.3 to 0.6 mol each of components (B) and (C) and 0.02 to 0.2 mol of fatty acid or its isocyanate, ester or halide, as component (E), are employed.

If a ketene dimer which is obtained from a fatty acid of the type mentioned and contains two fatty acid radicals per mol, as can be seen from formula (3), is employed as component (E), 0.01 to 0.25 mol of component (E) is preferably used per amino group equivalent of components (B) and (C). In particular, when the optional component (D) is not employed, 1 epoxy group equivalent of component (A) and 0.3 to 0.6 mol each of components (B) and (C) and 0.01 to 0.1 mol of the ketene dimer of a fatty acid, as component (E), are employed.

The sequence in which components (A), (B), (C), (E) and, where relevant, (D) are reacted with one another to form the reaction products according to the invention is of minor importance. However, as a rule, component (C) is initially introduced into the reaction vessel and is reacted first with component (A), then with component (B) and finally with component (E). It is also possible to subject components (A) and (C) to a precondensation reaction to give an epoxide/fatty amine reaction product, which is further reacted first with component (B) and finally with component (E). If the optional component (D) is also employed, it may be added, for example, after the reaction of components (A), (B) and (C) in the order given, and, finally, the further reaction with component (E) is carried out. However, it is also possible initially to introduce component (B) into the reaction vessel and first to react it with component (E) to give a fatty-modified polyalkylenepolyaminoamide, which is further reacted with the epoxide, as component (A), and then with the fatty amine, as component (C), or with a previously formed epoxide/fatty amine reaction product, the optional further reaction with the epihalogenohydrin, as component (D), being carried out last. In the procedure of especial interest, the fatty-modified polyalkylenepolyaminoamide reaction product previously formed from components (B) and (E) is subjected to a condensation reaction with an epoxide/-fatty amine reaction product of components (A) and (C) to give the reaction product according to the invention, without further reaction with an epihalogenohydrin as component (D).

The reaction products are always in the form of salts, since the addition of acid which has already been described, resulting in salt formation, is always carried out. The reaction product salts are as a rule homogeneous, mobile, fine emulsions, the strength of which, calculated as solids, is 10 to 40 percent by weight, preferably 20 to 30 percent by weight, and which are distinguished by their outstanding shelf life. Such emulsions of the reaction product salts according to the invention are used as paper sizes for engine-sizing and, preferably, for surface-sizing.

Before being used as paper sizes, the 10 to 40 percent by weight emulsions of the reaction products are diluted with water so that aqueous sizing liquors of a strength of 0.02 to 1, preferably 0.02 to 0.2, percent by weight, calculated as solids, are formed. In surface-sizing, the paper is impregnated with the dilute sizing liquor, in general at room temperature, for example by spraying or, in particular, by padding, and is then dried at 60° to 140° C., preferably 90° to 110° C., for 0.1 to 10, preferably 1 to 6, minutes. After drying, coating weights of the reaction product salts of 50 to 150 mg/m$^2$, preferably of 60 to 120 mg/m$^2$, calculated as solids, have been obtained.

Very good sizing effects, which are confirmed on the basis of positive test results, such as Cobb water absorption and the alkaline ink flotation time, can be achieved on paper even with small amounts of the reaction product salts according to the invention. In particular, in surface-sizing, the small amounts applied to the surface permit a rapid procedure, so that good sizing is already achieved within about 20 to 40 seconds at a drying temperature of, for example, 90° to 110° C. Moreover, the compatibility of the reaction product salts used according to the invention with the customary assistants used in the paper industry, such as starches, dyes, pigments, binders and, in particular, cationic fluorescent brighteners and other additives, is good. Furthermore, the reaction product salts do not tend to foam in an undesired manner.

In the examples which follow, parts and percentages are by weight.

EXAMPLE 1

31.2 parts of tallow fat amine (0.12 amino group equivalent of an industrial mixture of 30% of palmitylamine, 30% of stearylamine and 40% of oleylamine, which contains 3.84 amino equivalents/kg) are dissolved in 12 parts of isopropanol at 80° C. A solution of 45.4 parts of an epoxide formed from 2,2-bis-(4'-hydroxyphenyl)-propane and epichlorohydrin (0.24 epoxy group equivalent of the epoxide, which contains 5.29 epoxide equivalents/kg) in 12 parts of isopropanol is added to the fatty amine solution, whereupon an exothermic reaction starts. After the addition of the epoxide, the reaction mixture is kept at 85° C. for 15 minutes and then treated with a solution of 25.8 parts of a polyethylenepolyaminoamide formed from dimerised linoleic acid and triethylenetetramine (0.12 amino group equivalent of the polyaminoamide, which contains 4.65 amine equivalents/kg) in 30 parts of isopropanol. After the addition of the polyethylenepolyaminoamide, the reaction mixture is again heated to 85° C. and is kept at this temperature for 30 minutes, after which 14.5 parts of glacial acetic acid are added. After the addition of glacial acetic acid, a sample of the reaction mixture diluted with water in the ratio 1:5 has a pH value of 4.8. The reaction mixture is now cooled to 70° C. and is treated, at this temperature, with a solution of 31 parts of an industrial mixture of hexadecyl ketene dimer and tetradecyl ketene dimer (0.06 mol) in 31 parts of isopropanol. After the ketene dimer addition, the reaction mixture is heated to 70° C. again and is kept at this temperature for 1 hour, after which it is diluted with 434 parts of water. 666.9 parts of a mobile, fine emulsion with a solids content of 20% are obtained.

EXAMPLE 2

The procedure given in Example 1 is repeated, except that the 25.8 parts of the polyethylenepolyaminoamide are dissolved in 10 parts of isopropanol and, after the addition of glacial acetic acid, the reaction mixture is treated, at 85° C., with a solution of 15.4 parts (0.045 mol) of behenic acid in 15 parts of isopropanol and, after the addition of behenic acid, is heated to 85° C. again and kept at this temperature for 1 hour, after which it is diluted with 407 parts of water. 588.3 parts of a mobile, fine emulsion with a solids content of 20% are obtained.

EXAMPLE 3

The procedure given in Example 1 is repeated, except that the 25.8 parts of the polyethylenepolyaminoamide are dissolved in 10 parts of isopropanol and, after the addition of glacial acetic acid, the reaction mixture is treated, at 85° C., with a solution of 30.7 parts (0.108 mol) of stearic acid in 30 parts of isopropanol and, after the addition of stearic acid, is heated to 85° C. again and kept at this temperature for 1 hour, after which it is diluted with 454 parts of water. 665.6 parts of a mobile, fine emulsion with a solids content of 20% are obtained.

EXAMPLE 4

33.6 parts of tallow fat amine (0.12 amino group equivalent of an industrial mixture of 30% of palmitylamine, 30% of stearylamine and 40% of oleylamine, which contains 3.57 amine equivalents/kg) are dissolved in 12 parts of isopropanol at 80° C. A solution of 47.5 parts of an epoxide formed from 2,2-bis-(4'-hydroxyphenyl)-propane and epichlorohydrin (0.24 epoxy group equivalent of the epoxide, which contains 5.05 epoxide equivalents/kg) in 12 parts of isopropanol is added to the fatty amine solution, whereupon an exothermic reaction starts. After the addition of the epoxide, the reaction mixture is kept at 85° C. for 15 minutes and is then treated with a solution of 27 parts of a reaction product of 27 parts (0.009 mol) of stearyl chloride and 24.3 parts of a polyethylenepolyaminoamide formed from dimerised linoleic acid and triethylenetetramine (0.09 amino group equivalent of the polyaminoamide, which has an amine content of 3.7 equivalents/kg) in 12 parts of isopropanol. After the addition of the reaction product, the reaction mixture is heated again to 85° C. and kept at this temperature for 2 hours, after which 13 parts of glacial acetic acid are added and, finally, the mixture is diluted with 202 parts of water. 357.6 parts of a mobile, fine emulsion with a pH value of 4.5 and a solids content of 30% are obtained.

EXAMPLE 5

The procedure given in Example 4 is repeated, except that a solution of 44.6 parts of an epoxide formed as in Example 4, but with 5.37 epoxide equivalents/kg (0.24 epoxy group equivalent), in 12 parts of isopropanol is employed and, after the reaction with the epoxide, the reaction mixture is treated with a solution of 46 parts of a reaction product of 10.4 parts (0.037 mol) of octadecyl isocyanate and 35.6 parts of a polyethylenepolyaminoamide formed from dimerised linoleic acid and triethylenetetramine (0.15 amino group equivalent of the polyaminoamide, which contains 4.2 amine equivalents/kg) in 40 parts of isopropanol. After the addition of the reaction product, the reaction mixture is kept at 85° C. for 2 hours, after which 14.5 parts of glacial acetic acid are added and, finally, the mixture is diluted with 213 parts of water. 415.7 parts of a mobile, fine emulsion with a pH value of 4.4 and a solids content of 30% are obtained.

EXAMPLE 6

The procedure given in Example 4 is repeated, except that a solution of 44.6 parts of an epoxide, which is formed as in Example 4 but contains 5.37 epoxide equivalents/kg (0.24 epoxy group equivalent), in 12 parts of isopropanol is employed and, after the reaction with the epoxide, the reaction mixture is treated with a solution of 41.4 parts of a reaction product of 8.4 parts (0.028 mol) of methyl stearate and 33 parts of polyethylenepolyaminoamide formed from dimerised linoleic acid and triethylenetetramine (0.14 amino group equivalent of the polyaminoamide, which contains 4.2 amine equivalents/kg) in 37.6 parts of isopropanol. After the addition of the reaction product, the reaction mixture is kept at 85° C. for 2 hours, after which 14.4 parts of glacial acetic acid are added and, finally, the mixture is diluted with 203 parts of water. 398.6 parts of a mobile, fine emulsion with a pH value of 4.3 and a solids content of 30% are obtained.

EXAMPLE 7

39.84 parts of a mixture of 27% of 1-aminodocosane, 27% of 1-aminoeicosane, 36% of stearylamine and 10% of palmitylamine (0.12 amino group equivalent of the industrial mixture, which has an amine content of 3.01 equivalents/kg) are dissolved in 17 parts of ethylene glycol mono-n-butyl ether at 85° C. A solution of 45.6 parts of an epoxide formed from 2,2-bis-(4'-hydroxyphenyl)-propane and epichlorohydrin (0.24 epoxy group equivalent of the epoxide, which has an epoxide content of 5.26 equivalents/kg) in 15.2 parts of ethylene glycol mono-n-butyl ether are added to the fatty amine solution, whereupon an exothermic reaction starts. The reaction mixture is kept at 90° C. for 1 hour and is then treated with a solution of 27.6 parts of a reaction product of 0.7 part (0.0023 mol) of oleyl chloride and 29.6 parts of a polyethylenepolyaminoamide formed from dimerised linoleic acid and triethylenetetramine (0.11 amino group equivalent of the polyaminoamide, which has an amine content of 3.96 eqivalents/kg) in 15 parts of ethylene glycol mono-n-butyl ether. After this addition, the reaction mixture is kept at 90° C. for 30 minutes, after which it is treated with 11.1 parts (0.12 mol) of epichlorohydrin and kept at 90° C. for a further 30 minutes. A solution which contains 12 parts of 35% hydrochloric acid in 439 parts of water is then added to the reaction mixture. 622 parts of a mobile, fine emulsion with a solids content of 20% and a pH value of 4.7 are obtained.

EXAMPLE 8

A pure cellulose filter paper with a weight per unit area of 110 g/m$^2$ is padded, at a speed of 4 m/minute and under a pressure of 10 kg/cm$^2$, with an aqueous liquor which contains the amounts of emulsions from one of Examples 1 to 7 which are given in Table I which follows. The padded paper is dried at 90° C. for 10 minutes. The surface sizing achieved on the treated paper is subjected to the Cobb water absorption test for 30 seconds (Cobb$_{30}$ WA) as described in DIN 53,132. The lower the water absorption in Cobb$_{30}$ WA test is, the better is the surface sizing of the treated paper. The results of the Cobb$_{30}$ WA test are also given in Table I, which follows.

TABLE I

| Emulsion of Example | Strength* of the emulsion | Strength* of the padding liquor** | Coating weight* mg/m$^2$ | Result of the Cobb$_{30}$ WA test g/m$^2$ |
|---|---|---|---|---|
| 1 | 20 | 0.1 | 100 | 20 |
| 2 | 20 | 0.1 | 100 | 18 |
| 3 | 20 | 0.1 | 100 | 16 |
| 4 | 30 | 0.1 | 100 | 18 |
| 5 | 30 | 0.1 | 100 | 41 |
| 6 | 30 | 0.1 | 100 | 25 |
| 7 | 20 | 0.1 | 100 | 16 |
| untreated paper | | | | 188 |

*calculated as solids
**obtained by diluting the 20 or 30% emulsions of one of Examples 1 to 7 with the appropriate amount of water

What is claimed is:

1. A reaction product salt of (A) 1.0 epoxy group equivalent of a diglycidyl ether of 2,2-bis-(4'-hydroxyphenyl)-propane, (B) 0.2 to 1.0 amino group equivalent of a polyalkylenepolyaminoamide of (B') a polymerised, unsaturated fatty acid which is derived from fatty acids having 12 to 24 carbon atoms and (B") an aliphatic polyalkylenepolyamine having 4 to 12 carbon atoms, (C) 0.3 to 0.6 amino group equivalent of at least one primary fatty amine having 12 to 24 carbon atoms, (D) 0 to 1.0 mol, per epoxy group equivalent of component (A), of an epihalogenohydrin and (E) 0.01 to 0.5 mol, per mol of amino group equivalent of components (B) and (C), of at least one saturated or unsaturated fatty acid having 12 to 24 carbon atoms, or an alkyl ester, having 1 to 4 carbon atoms in the alkyl radical, isocyanate, halide or ketene dimer thereof, the reaction being carried out in the presence of an inert, organic solvent or in a melt at temperatures up to 110° C., and it being ensured, by adding an acid, at the latest when the reactions have ended, that a sample of the reaction mixture diluted with water to 10 to 40 percent by weight has a pH value of 2 to 8, a salt being formed.

2. A reaction product salt according to claim 1, in which a diglycidyl ether of 2,2-bis-(4'-hydroxyphenyl)-propane which contains 5 to 5.5 epoxy group equivalents per kg is employed as component (A).

3. A reaction product salt according to claim 1, in which a polymerised acid which is derived from an ethylenically unsaturated fatty acid having 16 to 18 carbon atoms is employed as component (B').

4. A reaction product salt according to claim 1, in which diethylenetriamine, triethylenetetramine or tetraethylenepentamine is employed as component (B'').

5. A reaction product salt according to claim 1, in which a primary fatty amine having 16 to 18 carbon atoms is employed as component (C).

6. A reaction product salt according to claim 1, in which epichlorohydrin is emloyed as component (D).

7. A reaction product salt according to claim 1, which is prepared from component (A), a polyalkylenepolyaminoamide and a fatty amine each containing 3 to 5 amino group equivalents per kg, as components (B) and (C), and component (E).

8. A reaction product salt according to claim 1, which is prepared from 0.1 to 0.5 mol of the additional component (D) per epoxy group equivalent of component (A).

9. A reaction product salt according to claim 1, which is prepared by taking a reaction product of components (A) and (C) and then reacting this product first with component (B) and then with component (E).

10. A reaction product salt according to claim 1, which is prepared by taking component (C) and then reacting this with component (A), then with component (B) and finally with component (E).

11. A reaction product salt according to claim 1, which is prepared by reacting components (A), (B) and (C) in the order given and then reacting the product with component (D) and finally with component (E).

12. A reaction product salt according to claim 1, which is prepared by reacting component (B) with component (E) and then with components (A) and (C), and, finally, with the optional component (D).

13. A reaction product salt according to claim 1, which is prepared by reacting a reaction product of components (B) and (E) with a reaction product of components (A) and (C).

14. A reaction product salt according to claim 1, which is prepared by adding at least one inorganic acid or at least one organic acid having at most 4 carbon atoms.

15. A reaction product salt according to claim 1, which is prepared by adding hydrochloric acid, nitric acid, phosphoric acid or sulfamic acid or a saturated mono- or di-carboxylic acid having at most 4 carbon atoms, or mixtures thereof.

16. A reaction product salt according to claim 1, which is prepared by adding sulfamic acid by itself or orthophosphoric acid, with subsequent addition of formic acid or acetic acid.

17. A reaction product salt according to claim 1, which is prepared by adding oxalic acid, formic acid or acetic acid.

18. A reaction product salt according to claim 1, which is prepared by adding acetic acid and of which a diluted sample has a pH value of 4 to 6.

19. A reaction product salt according to claim 1, in which an alkyl ester, having 1 to 4 carbon atoms in the alkyl radical, an isocyanate or a halide of a saturated or unsaturated fatty acid having 12 to 24 carbon atoms is employed as component (E), and the addition of acid takes place after the reaction with component (E).

20. A reaction product salt according to claim 1, in which a saturated or unsaturated fatty acid having 12 to 24 carbon atoms or a ketene dimer thereof is employed as component (E), and the addition of acid takes place before the reaction with component (E).

21. A reaction product salt according to claim 1, in which a saturated or unsaturated fatty acid having 12 to 24 carbon atoms or an alkyl ester, having 1 to 4 carbon atoms in the alkyl radical, isocyanate or halide thereof is employed as component (E).

22. A reaction product salt according to claim 1, in which 0.02 to 0.5 mol, per amino group equivalent of components (B) and (C), of a saturated or unsaturated fatty acid having 12 to 24 carbon atoms or of an alkyl ester, having 1 to 4 carbon atoms in the alkyl radical, isocyanate or halide thereof is employed as component (E).

23. A reaction product salt according to claim 1, in which a saturated or unsaturated fatty acid having 16 to 18 carbon atoms or an ethyl or methyl ester thereof, isocyanate thereof or chloride thereof is employed as component (E).

24. A reaction product salt according to claim 1, in which the chloride of a saturated or unsaturated fatty acid having 16 to 18 carbon atoms is employed as component (E).

25. A reaction product salt according to claim 1, in which 0.3 to 0.6 amino group equivalent of each of components (B) and (C), per epoxy group equivalent of component (A), and 0.02 to 0.2 mol, per amino group equivalent of components (B) and (C), of a saturated or unsaturated fatty acid having 16 to 18 carbon atoms or of an ethyl or methyl ester thereof, isocyanate thereof or chloride thereof, as component (E), are employed.

26. A reaction product salt according to claim 1, in which the ketene dimer of a saturated or unsaturated fatty acid having 12 to 24 carbon atoms is employed as component (E).

27. A reaction product salt according to claim 1, in which 0.01 to 0.25 mol of the ketene dimer of a saturated or unsaturated fatty acid having 12 to 24 carbon atoms is employed, per amino group equivalent of components (B) and (C), as component E.

28. A reaction product salt according to claim 1, in which the ketene dimer of a saturated or unsaturated fatty acid having 16 to 18 carbon atoms is employed as component (E).

29. A reaction product salt according to claim 1, in which 0.3 to 0.6 amino group equivalent of each of components (B) and (C) per epoxy group equivalent of component (A), and 0.01 to 0.1 mol, per amino group equivalent of components (B) and (C), of the ketene dimer of a saturated or unsaturated fatty acid having 12 to 24 carbon atoms, as component (E), are employed.

30. A reaction product salt according to claim 1, which is prepared in the presence of an inert, organic solvent at 60° to 95° C.

31. A reaction product salt according to claim 1, which is prepared in the presence of a cycloaliphatic or aliphatic ether having 2 oxygen atoms and 4 to 8 carbon atoms, as the solvent.

32. A reaction product salt according to claim 1, which is prepared in the presence of an alkanol having 1 to 4 carbon atoms, as the solvent.

33. A reaction product salt according to claim 1, which is prepared in the presence of benzine, petroleum ether, benzene, tetralin, cyclohexane, halogenated or lower alkyl-substituted benzene or halogenated hydrocarbons having 1 to 2 carbon atoms if a fatty acid chloride or isocyanate is employed as component (E).

34. A reaction product salt according to claim 1, in which the reaction with component (E) is carried out in a melt if a fatty acid chloride or isocyanate is employed as component (E).

35. A reaction product salt according to claim 1, which is in the form of a 10 to 40 percent by weight mobile, fine emulsion which is stable on storage.

36. A process for the preparation of a reaction product salt according to any one of claims 1 to 35, which comprises reacting, as component (A), 1.0 epoxy group equivalent of a diglycidyl ether of 2,2-bis-(4'-hydroxyphenyl)-propane and, as component (B), 0.2 to 1.0 amino group equivalent of a polyalkylenepolyaminoamide of (B') a polymerised, unsaturated fatty acid which is derived from fatty acids having 12 to 24 carbon atoms and (B'') an aliphatic polyalkylenepolyamine having 4 to 12 carbon atoms and, as component (C), 0.3 to 0.6 amino group eqivalent of at least one primary fatty amine having 12 to 24 carbon atoms, and, as component (D), 0 to 1.0 mol, per epoxy group equivalent of component (A), of an epihalogenohydrin and, as component (E), 0.01 to 0.5 mol, per mol of amino group equivalent of components (B) and (C), of a saturated or unsaturated fatty acid having 12 to 24 carbon atoms, or an alkyl ester, having 1 to 4 carbon atoms in the alkyl radical, isocyanate, halide or ketene dimer thereof, in any order, in the presence of an inert organic solvent, at temperatures of up to 110° C., it being ensured, by adding an acid, at the latest when the reactions have ended, that a sample of the reaction mixture diluted to 10 to 40 percent by weight with water has a pH value of 2 to 8, a salt being formed.

* * * * *